United States Patent
Sjolander

(10) Patent No.: US 9,975,123 B2
(45) Date of Patent: May 22, 2018

(54) LAMINATED MICROFLUIDIC DEVICE WITH MEMBRANE VALVES

(71) Applicant: GE Healthcare Bio-Sciences AB, Uppsala (SE)

(72) Inventor: Stefan Sjolander, Uppsala (SE)

(73) Assignee: GE HEALTHCARE BIO-SCIENCES AB, Uppsala (SE)

(*) Notice: Subject to any disclaimer, the term of this patent is extended or adjusted under 35 U.S.C. 154(b) by 61 days.

(21) Appl. No.: 15/103,501

(22) PCT Filed: Nov. 28, 2014

(86) PCT No.: PCT/EP2014/075989
§ 371 (c)(1),
(2) Date: Jun. 10, 2016

(87) PCT Pub. No.: WO2015/090908
PCT Pub. Date: Jun. 25, 2015

(65) Prior Publication Data
US 2016/0310946 A1  Oct. 27, 2016

Related U.S. Application Data

(60) Provisional application No. 61/918,357, filed on Dec. 19, 2013.

(51) Int. Cl.
*B01L 3/00* (2006.01)
*B29C 45/14* (2006.01)
(Continued)

(52) U.S. Cl.
CPC ... *B01L 3/502738* (2013.01); *B01L 3/502707* (2013.01); *B29C 45/14344* (2013.01);
(Continued)

(58) Field of Classification Search
None
See application file for complete search history.

(56) References Cited

U.S. PATENT DOCUMENTS

| 5,313,264 A | 5/1994 | Ivarsson et al. |
| 5,573,956 A | 11/1996 | Hanning |

(Continued)

FOREIGN PATENT DOCUMENTS

| CN | 1326549 A | 12/2001 |
| WO | 2002036485 A1 | 5/2002 |
| WO | 03/015923 A1 | 2/2003 |

OTHER PUBLICATIONS

International Search Report and Written Opinion regarding International Application No. PCT/EP2014/075989, dated Feb. 25, 2015, 10 pages.

(Continued)

*Primary Examiner* — Xiaoyun R Xu
(74) *Attorney, Agent, or Firm* — Rong Zhang

(57) ABSTRACT

The invention relates to a method for making a laminated microfluidics with membrane valves. The method comprises (a) generating a membrane valve assembly comprising (1) laminating three plastic foils together, the top foil comprising one through hole for each valve, the middle foil has a slit pattern connecting each valve hole of the top foil, and the bottom foil has one through hole for each valve and one additional hole entering the slit pattern; (2) placing the laminated foil, bottom foil down on a mould half having a smooth mould surface with one or more perpendicularly protruding cylinders that concentrically fit within the through holes of the laminated foil yet leave room for a membrane to form, and clamping a second mould half to close the mould; (3) injecting and allowing to cure a liquid rubber through a funnel associated with the bottom mould half and the additional hole on the bottom foil layer; and (b)

(Continued)

laminating the membrane valve assembly and a flow path. Also provided is a membrane valve assembly made according to the method.

26 Claims, 7 Drawing Sheets

(51) Int. Cl.
  *F16K 99/00* (2006.01)
  *B32B 38/00* (2006.01)
  *B29K 21/00* (2006.01)

(52) U.S. Cl.
  CPC .......... *B32B 38/00* (2013.01); *F16K 99/0015* (2013.01); *B01L 2200/0689* (2013.01); *B01L 2200/12* (2013.01); *B01L 2300/0887* (2013.01); *B01L 2300/123* (2013.01); *B01L 2400/0655* (2013.01); *B29C 45/14811* (2013.01); *B29K 2021/003* (2013.01); *B32B 2250/05* (2013.01); *B32B 2367/00* (2013.01); *B32B 2369/00* (2013.01); *B32B 2379/08* (2013.01); *F16K 2099/008* (2013.01); *F16K 2099/0078* (2013.01); *F16K 2099/0084* (2013.01)

(56) References Cited

U.S. PATENT DOCUMENTS

| | | |
|---|---|---|
| 5,641,640 A | 6/1997 | Hanning |
| 5,932,799 A | 8/1999 | Moles |
| 6,698,454 B2 | 3/2004 | Sjolander |
| 6,919,046 B2 | 7/2005 | O'Connor et al. |
| 2004/0228734 A1 | 11/2004 | Jeon et al. |
| 2008/0178987 A1 | 7/2008 | Zhou et al. |
| 2009/0165873 A1 | 7/2009 | Atkin et al. |
| 2009/0165876 A1 | 7/2009 | Atkin et al. |

OTHER PUBLICATIONS

Jonsson, U., et al., "Real-time Biospecific Interaction Analysis Using Surface Plasmon Resonance and a Sensor Chip Technology", BioTechniques, vol. 11, No. 5, pp. 620-627, 1991.

First Chinese Office Action in Chinese dated Mar. 16, 2017 for corresponding CN application No. 201480069363.9; 6 pages.

LAMINATED MICROFLUIDIC DEVICE WITH MEMBRANE VALVES

CROSS-REFERENCE TO RELATED APPLICATIONS

This application is a filing under 35 U.S.C. 371 of international application number PCT/EP2014/075989, filed Nov. 28, 2014, which claims priority to U.S. application No. 61/918357, filed Dec. 19, 2013, the entire disclosures of each of which are hereby incorporated by reference.

FIELD OF THE INVENTION

The present invention relates to a novel method of making laminated microfluidics with membrane valves that is useful for regulating the flow of a liquid sample through an analytical instrument such as, for example, a biosensor. The invention also relates to laminated microfluidics with membrane valves made according to such a method, as well as a method and system of using the novel laminated microfluidics.

BACKGROUND OF THE INVENTION

A variety of analytical techniques are used to characterize interactions between molecules, particularly in the context of assays directed to the detection and interaction of biomolecules. For example, antibody-antigen interactions are of fundamental importance in many fields, including biology, immunology and pharmacology. In this context, many analytical techniques involve binding of a "ligand", such as an antibody, to a solid support, followed by contacting the ligand with an "analyte", such as an antigen. Following contact of the ligand and analyte, some characteristic is measured which is indicative of the interaction, such as the ability of the ligand to bind the analyte.

Analytical sensor systems that can monitor such molecular interactions in real time are gaining increasing interest. These systems are often based on optical biosensors and usually referred to as interaction analysis sensors or biospecific interaction analysis sensors. A representative biosensor system is the Biacore® instrumentation sold by GE Healthcare Life Sciences, which uses surface plasmon resonance (SPR) for detecting interactions between molecules in a sample and molecular structures immobilized on a sensing surface. With the Biacore® systems it is possible to determine in real time without the use of labeling not only the presence and concentration of a particular molecule in a sample, but also additional interaction parameters such as, for instance, the association rate and dissociation rate constants for the molecular interaction. The apparatus and theoretical background are fully described in the literature (see e.g., Jonsson, U., et al., BioTechniques 11: 620-627 (1991)). Essentially, the technique involves the immobilization of a ligand to the special surface of a sensor chip, contacting the sensor chip with a flow of sample containing the analyte of interest, and then measuring the change in the surface optical characteristics of the sensor chip arising from the binding of interest. For further details on SPR, reference is also made to U.S. Pat. Nos. 5,313,264; 5,573,956 and 5,641,640.

The integrated microfluidic cartridge (IFC) is a key part in the Biacore instruments. The current IFC is costly to produce and the moulds needed are time consuming to make. Because of the thickness of the injection moulded plates, dead volume of via-holes are rather big. U.S. Pat. No. 6,698,454 describes a new valve design for an IFC with a minimum of silicone rubber (or other elastomer) moulding, compared to the IFC on the market with in silicone rubber flow channels and valves. However, an IFC incorporating such a design has not been introduced onto the market.

Laminated foil microfluidic channels/reactors are available from Takasago Electric, Japan. These are combined with micro-solenoid valves as complete microfluidic devices. Method of making laminated microfluidic structures have also been described before. Various adhesives and strong organic solvents have been used for laminating together polymeric material. US20080178987A1 describes a method that used weak organic material (e.g., acetonitrile) instead of strong organic solvents or adhesives to laminate. U.S. Pat. No. 5,932,799 describes adhesiveless bonding of polyimide films for the generation of microfluidic modules. There, a flexible polymer layer is bonded to the microchannel layers to serve as valves. An exemplary valve layer is given as composed of DuPont's Kapton® KJ thermoplastic polyimide film, with a preferred thickness of about 1 mil.

There is a need, for a valve and associated IFC which is cheaper to make and yet have better performance than the current offerings.

BRIEF SUMMARY OF THE INVENTION

The present invention discloses a novel method of making laminated microfluidics with membrane valves that is useful for regulating the flow of a liquid sample through an analytical instrument such as, for example, a biosensor. The present invention further discloses a laminated microfluidics with membrane valves made according to such a method, as well as a method of using the novel laminated microfluidics.

Thus, a first aspect of the present invention is to provide a novel method of making laminated microfluidics with membrane valves that is useful for regulating the flow of a liquid sample through an analytical instrument. The method comprises the following steps:

a) generating a membrane valve assembly comprising (1) laminating three plastic foils together, the first, top foil comprising one through hole for each valve, the second, middle foil has a slit pattern connecting each valve hole of the top foil, and the third, bottom foil has one through hole for each valve and one additional hole entering the slit pattern; (2) placing the laminated foil, bottom foil down on a mould half having a smooth mould surface with one or more perpendicularly protruding cylinders that concentrically fit within the through holes of the laminated foil yet leave room for a membrane to form, and clamping a second mould half to close the mould; (3) injecting and allowing to cure a liquid rubber through a funnel associated with the, bottom mould half and the additional hole on the bottom foil layer; and b) laminating the membrane valve assembly and a flow path comprising a fourth and a fifth plastic foil, wherein the fourth foil contains a slit pattern, with the fourth foil on top of the first foil and the fifth foil on top of the fourth foil.

In another aspect of the present invention, it is provided a laminated microfluidics with membrane valves. The laminated microfluidics comprises 1) a membrane valve assembly comprising (1) three plastic foils laminated together, the first, top foil comprising one through hole for each valve, the second, middle foil has a slit pattern connecting each valve hole of the top foil, and the third, bottom foil has one through hole for each valve and one additional hole entering the slit pattern; (2) a flexible membrane formed in the through hole by liquid rubber injected through the additional hole on the bottom foil layer and the slit pattern; and 2) a flow path comprising a fourth and a fifth plastic foil, wherein the fourth foil contains a slit pattern, with the fourth foil on top of the first foil and the fifth foil on top of the fourth foil;

wherein the membrane valve assembly and the flow path are laminated together.

In another aspect, the present invention provides an analytical system for studying molecular interactions, which comprises the laminated microfluidics with membrane valves according to certain embodiments of the invention.

In another aspect, the present invention provides a method of analyzing molecular interaction using an IFC incorporating the laminated microfluidics made according to an aspect of the current invention.

Further details and advantages of the present invention will appear from the description and claims below.

BRIEF DESCRIPTION OF THE DRAWINGS

FIG. 1 (b) presents a schematic of a part of a membrane valve made according to certain embodiments of the invention.

DETAILED DESCRIPTION OF THE INVENTION

Figure 1A:
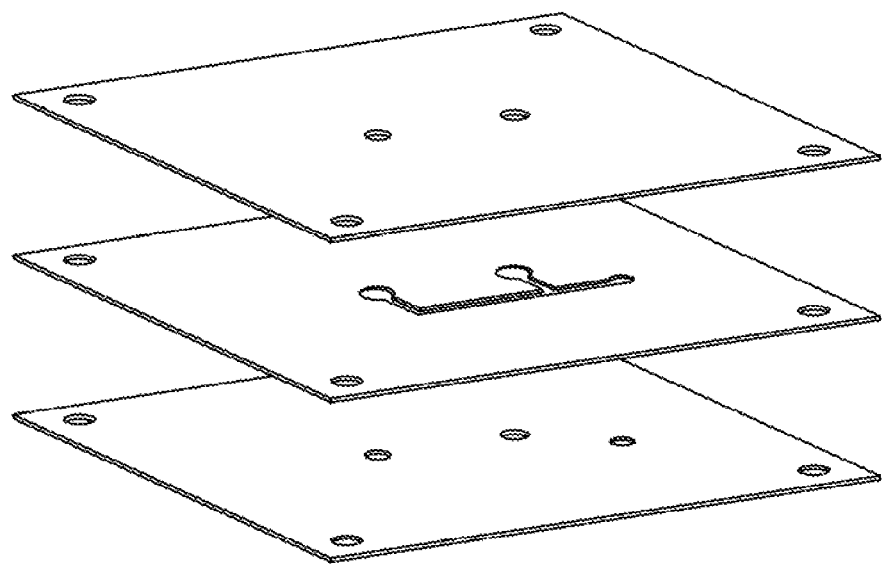
FIG. 1 (a) shows a schematic drawing of three foil layers with through holes and slits that when laminated together, form a membrane valve assembly according to certain embodiments of the invention.

As mentioned above, the present invention relates to a novel method of making laminated microfluidics with membrane valves that is useful for regulating the flow of a liquid sample through an analytical instrument such as, for example, a biosensor, as well as the laminated microfluidics with membrane valves made according to the method. Although many specific details of certain embodiments of the invention are set forth in the following detailed description and accompanying Figures, those skilled in the art will recognize that the present invention may have additional embodiments, or that the invention may be practiced without several of the details described herein.

In the several embodiments set forth below, the inventive laminated microfluidics with membrane valves of this invention are integrally associated with microfluidic liquid transport assemblies, such as, for example, those adapted for use with "biosensors". As is appreciated by those skilled in the art, biosensors are analytical devices for analyzing minute quantities of sample solution having an analyte of interest, wherein the analyte is analyzed by a detection device that may employ a variety of detection methods. Typically, such methods include, but are not limited to, mass detection methods, such as piezoelectric, optical, thermo-optical and surface acoustic wave (SAW) device methods, and electrochemical methods, such as potentiometric, conductometric, amperometric and capacitance methods. With regard to optical detection methods, representative methods include those that detect mass surface concentration, such as reflection-optical methods, including both internal and external reflection methods, angle, wavelength or phase resolved, for example ellipsometry and evanescent wave spectroscopy (EWS), the latter including surface plasmon resonance (SPR) spectroscopy, Brewster angle refractometry, critical angle refractometry, frustrated total reflection (FTR), evanescent wave ellipsometry, scattered total internal reflection (STIR), optical wave guide sensors, evanescent wave-based imaging, such as critical angle resolved imaging, Brewster angle resolved imaging, SPR angle resolved imaging, and the like. Further, photometric methods based on, for example, evanescent fluorescence (TIRF) and phosphorescence may also he employed, as well as waveguide interferometers. One exemplary biosensor is disclosed in U.S. Pat. No. 5,313,264, which is incorporated herein by reference in its entirety.

Thus, in one embodiment of the invention, it is provided a method of making a laminated microfluidics with membrane valves. The method comprises the following steps:

a) generating a membrane valve assembly comprising (1) laminating three plastic foils together, the first, top foil comprising one through hole for each valve, the second, middle foil has a slit pattern connecting each valve hole of the top foil, and the third, bottom foil has one through hole for each valve and one additional hole entering the slit pattern; (2) placing the laminated foil, bottom foil down on a mould half having a smooth mould surface with one or more perpendicularly protruding cylinders that concentrically fit within the through holes of the laminated foil yet leave room for a membrane to form, and clamping a second mould half to close the mould; (3) injecting and allowing to cure a liquid rubber through a funnel associated with the bottom mould half and the additional hole on the bottom foil layer; and b) laminating the membrane valve assembly and a flow path comprising a fourth and a fifth plastic foil, wherein the fourth foil contains a slit pattern, with the fourth foil on top of the first foil and the fifth foil on top of the fourth foil.

Figure 1B:
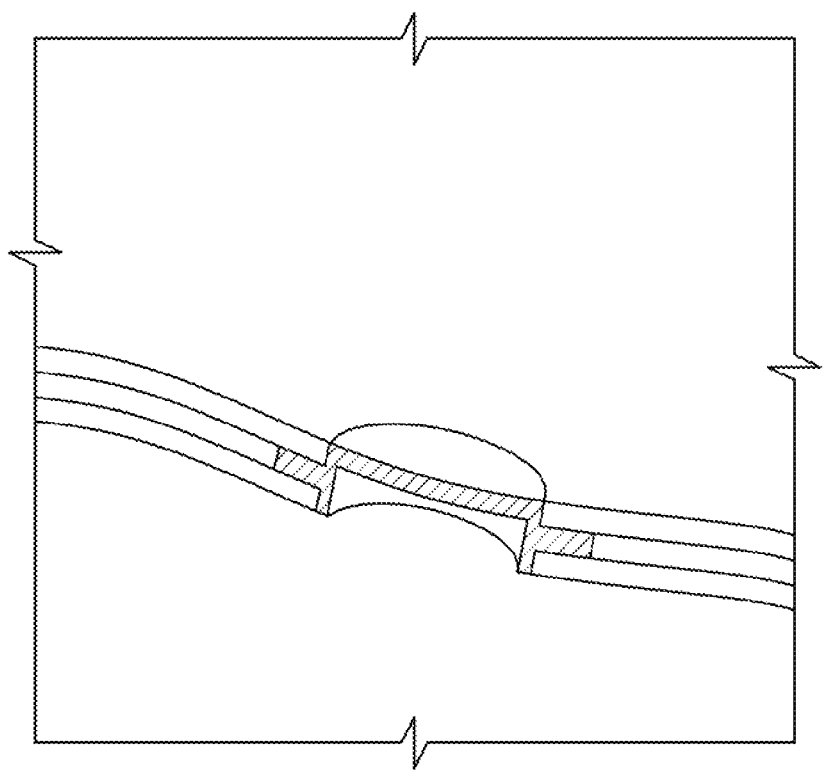

A first step in making a laminated microfluidics with membrane valves is the making of a membrane valve assembly as illustrated in FIG. 1.

Three plastic foils/films/sheets with appropriate through holes and/or slits (i.e., channels) are laminated to form a base for moulding membrane valves thereon. These plastic foils/films/sheets preferably have a thickness in the ranges of between 0.1 mm-0.2 mm. As illustrated in FIG. 1a, the top foil includes one through hole (Ø0.2-0.5 mm) for each valve, the second, middle foil has a slit pattern connecting each valve hole of the top foil and the bottom foil has one hole (of about equal diameter as the through hole on the top foil) for each valve and one additional hole (of a diameter about equal the width of the slit) entering the slit pattern. The diameter of the through hole and the width of the slit may be adjusted, for example based on the thickness of the plastic foil. The middle foil may optionally be coated with adhesive to facilitate lamination of the three foils. The top and bottom foil may also optionally be coated with adhesive to facilitate lamination. Optionally the bottom foil on the side away from the middle foil is covered by a liner. The plastic foils/films/sheets may be connected together by any of a number of suitable bonding techniques such as, for example, gluing or by an ultrasonic or laser welding technique. For example, the foils may be glue coated, thus the lamination may be accomplished by heat (80-150° C.) or pressure. Alternatively, the foils may be pre-coated with adhesive for lamination by heat or pressure. In certain embodiments, both sides of the foils may be pre-coated. In other embodiments, only one side of the foils may be pre-coated. Alternatively, adhesive tapes such as double side adhesive tapes may be used to glue together the plastic foils. Alternatively, laser welding may be used to join plastic materials having different optical absorptions at the laser wavelength. The laser light may penetrate the transparent component (e.g., foil #1) and is then absorbed e non-transparent component (e.g., foil #2) where it is converted into heat. The first and second plastic foils melt at the interface and welding may be effected by external pressure applied by a workholding fixture. In this manner, a welded unit inclusive of the first and second flat plastic foils may be formed. Laser welding may be used to join together up to three plastic foils at the same time (one black between two transparent)

The laminated assembly is optionally treated for silicone rubber adhesion by, i.e., plasma treatment or chemical priming etc. The top foil may be covered with a breathable low tack-liner as an option to let air escape from the cavity during filling. The assembly may then be placed in a mould that consists of two halves to facilitate formation of an internal flexible membrane that defines part of the valve. More specifically, the assembly is placed bottom foil down on a mould half having a smooth mould surface with one or more perpendicularly protruding cylinders that are adapted to concentrically fit within the through holes associated with the three plastic foils. In general, the protruding cylinders have flat top surfaces, are preferably about 0.1 mm shorter than the thickness of the laminated assembly, and have diameters that are preferably about 0.1 mm less than the diameters of the through holes. A second mould half (for example partly from sintered material) also has a smooth mould surface, and is clamped on top (against the top foil liner). Liquid rubber (for instance RTV silicone) is injected through a funnel associated with the bottom mould half and the additional hole on the bottom foil layer, thus creating a valve unit. Figure lb. Optional liner on top foil evacuates air during filling. The optional bottom foil liner, together with the top liner, leaves the foil surface clean when the laminated assembly is removed after curing. While a simple slit pattern is shown in Figure la with three foil layers, a skilled person understands that many complex slit patterns may be designed, and valves controlling three dimensional flow paths may be built by using more than two foil layers.

As is appreciated by those skilled in the art, casting is the process whereby a liquid is poured into a mould and allowed to react, cure, or harden to form a solid object in the shape of the mould cavity. Moreover, it is to be understood that suitable thermoplastic elastomers for purposes of the present invention include a thermoplastic polyurethane elastomer (i.e., TPU), a polyolefin-based thermoplastic elastomer (i.e., TPO), a thermoplastic elastomer based on dynamically vulcanized elastomer-thermoplastic blends (i.e., TPV), styrene block thermoplastic elastomer, a thermoplastic polyether ester elastomer, a thermoplastic elastomer based on halogen-containing polyolefins, and a thermoplastic elastomer based on polyamides, as well as various combinations and blends thereof.

Figure 2:
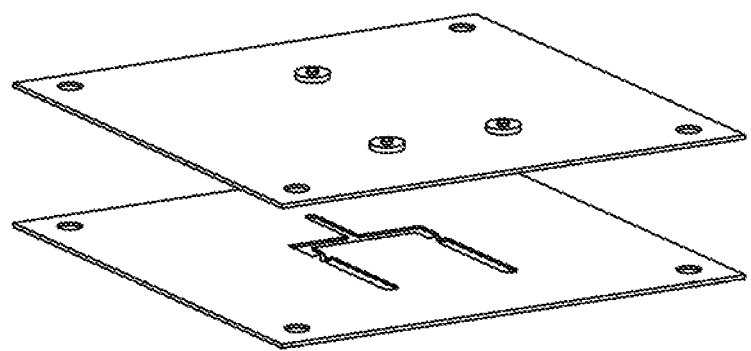
FIG. 2 shows a schematic drawing of two foil layers with slits and through holes, that when laminated together, forms a flow path assembly according to certain embodiments of the invention.

Another step in making the laminated microfluidics with membrane valves is the making of a flow path assembly as illustrated in FIG. 2. A foil/sheet containing a slit pattern and another foil having through holes for liquid connections are laminated together to form the flow path. Soft surfaces such as flow cells and seals for connecting can be moulded on the second foil prior to laminating. The foils may optionally be coated, on the sides facing each other, with adhesive to facilitate lamination. While a simple slit pattern is shown here with two foil layers, a skilled person understands that many complex slit patterns may be designed, and three dimensional flow path may be formed by using more than two foil layers.

An alternative design compared to FIG. 2 places the through holes for liquid connections on the membrane valve assembly. Thus, these through holes connect with the slit pattern of the flow path. Soft surfaces such as flow cells and seals for connecting can be moulded, at the time the valves are moulded when forming the membrane valve assembly. (not shown.)

A third step in making the laminated microfluidics with membrane valves is the lamination together of the membrane valve assembly and the flow path assembly, after removing the breathable low tack-liner from the top of the membrane valve assembly.

In an alternative embodiment, the membrane valve assembly and the individual foil sheets making up the flow path may be laminated together at the same time to form the laminated microfluidics.

The material used for the foil sheets are plastic foils, such as Polyester, Polycarbonate, Polyethylene terephthalate and Polyimide. A person skilled in the art could readily choose the correct material to use, depending on application demands on chemical resistance, flexibility etc.

In certain embodiments, the foils are previously provided with slit and through holes suitable for forming the membrane valve assembly, the flow path assembly and the laminated microfluidics. Preferably, the slits and through holes are made by laser cutting. Alternatively, other ways of cutting, like die cut can be used.

Laser cutting is made with foils sitting on a low-tack liner. The laser beam allows for controlled fusing of the foils and films and produces clear and sealed cutting edges. With laser cutting, even the smallest radii slit and through holes can be cut precisely and produce simple geometries at record speed. During laser cutting, no pressure is exerted on the foils or films by a tool, the entire process is contact-less and consequently, the end product will turn out perfect. Laser cutting of the foil or film will not result in chipping of paint from the end product.

Figure 3:
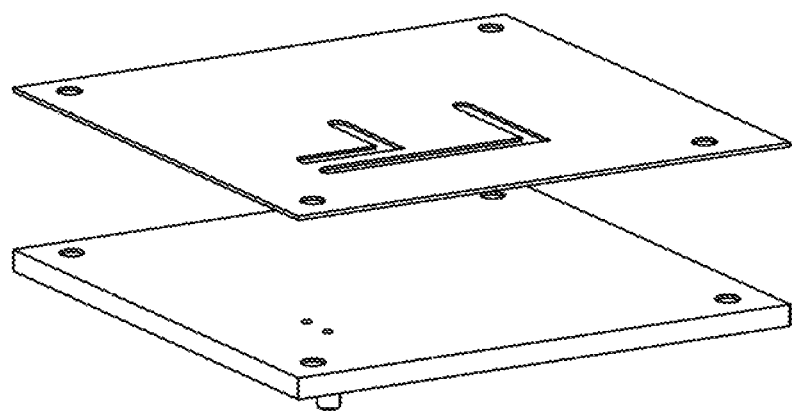
FIG. 3 presents a schematic drawing showing foil containing channels for compressed air operating the valves, and a bottom moulded plastic part with integrated connectors for air and features for positioning the unit in an analytical instrument, as part of a laminated microfluidics with membrane valves according to certain embodiments of the invention.

In certain embodiments, the laminated microfluidics with membrane valves further includes channels for compressed air operating the valves. These channels could be made in foil sheets as shown in FIG. 3. Here, the bottom foil is optionally made of a moulded plastic part with integrated connectors for air and features for positioning the unit in an analytical instrument.

Alternatively, the channels could be part of the moulded plastic part, with integrated connectors for air and features for positioning the unit in an analytical instrument.

The plastic foils/parts containing channels for compressed air as well as integrated connectors for air shown in FIG. 3 are laminated to the side of the membrane valve assembly. Alternatively, when the through holes for liquid connections are located on the membrane valve assembly, these plastic foils/parts are laminated to the side of the fifth plastic foil of the flow path.

Thus, in certain embodiments, the method of making a laminated microfluidics with membrane valves further includes providing a foil containing channels for compressed air operating the valves, and a bottom foil or moulded plastic part with integrated connectors for air and features for positioning the unit in an analytical instrument. The foil containing channels for compressed air, and the bottom foil or moulded plastic part may be first laminated together to form a compressed air assembly. Then, it is laminated together with the membrane valve assembly and the flow path assembly to form the laminated microfluidics.

Alternatively, the channels for compressed air operating the valves are part of the moulded plastic part, with integrated connectors for air and features for positioning the unit in an analytical instrument.

Figure 4:
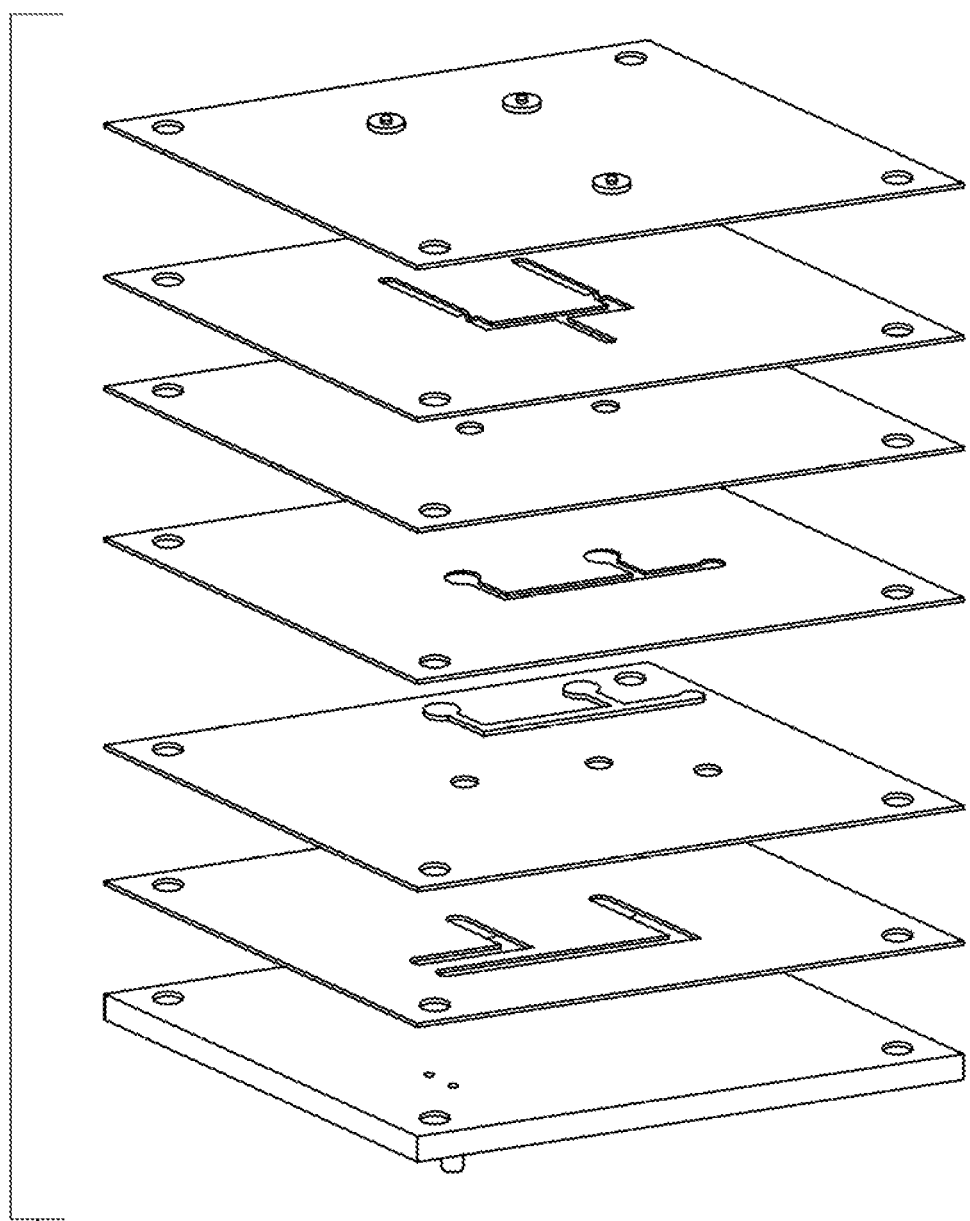
FIG. 4 is a schematic that shows each individual foil/sheet that forms a laminated microfluidics with membrane valves according to certain embodiments of the invention.
Figure 5A:
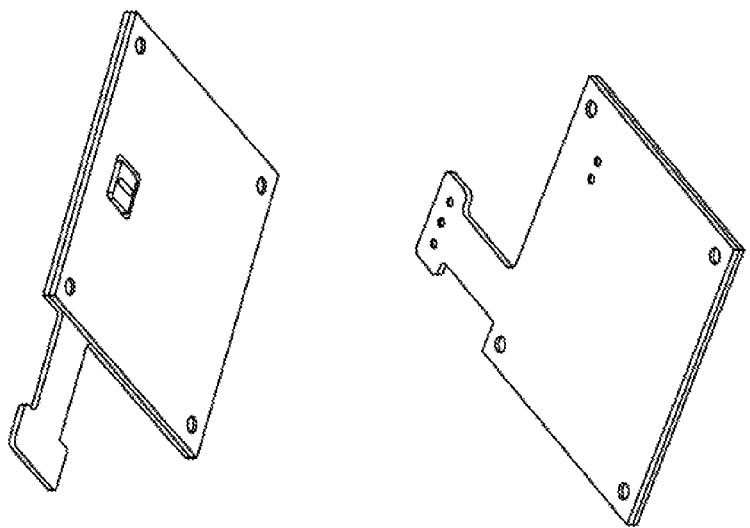
FIG. 5 shows an alternative design of a laminated microfluidics with membrane valves according to certain other embodiments of the invention.
Figure 5A:
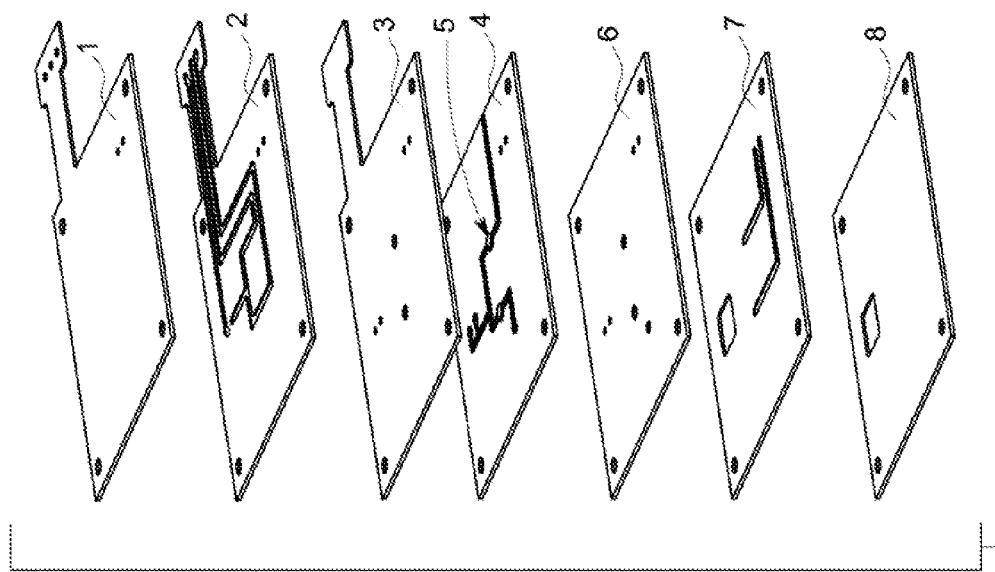
Figure 5B:
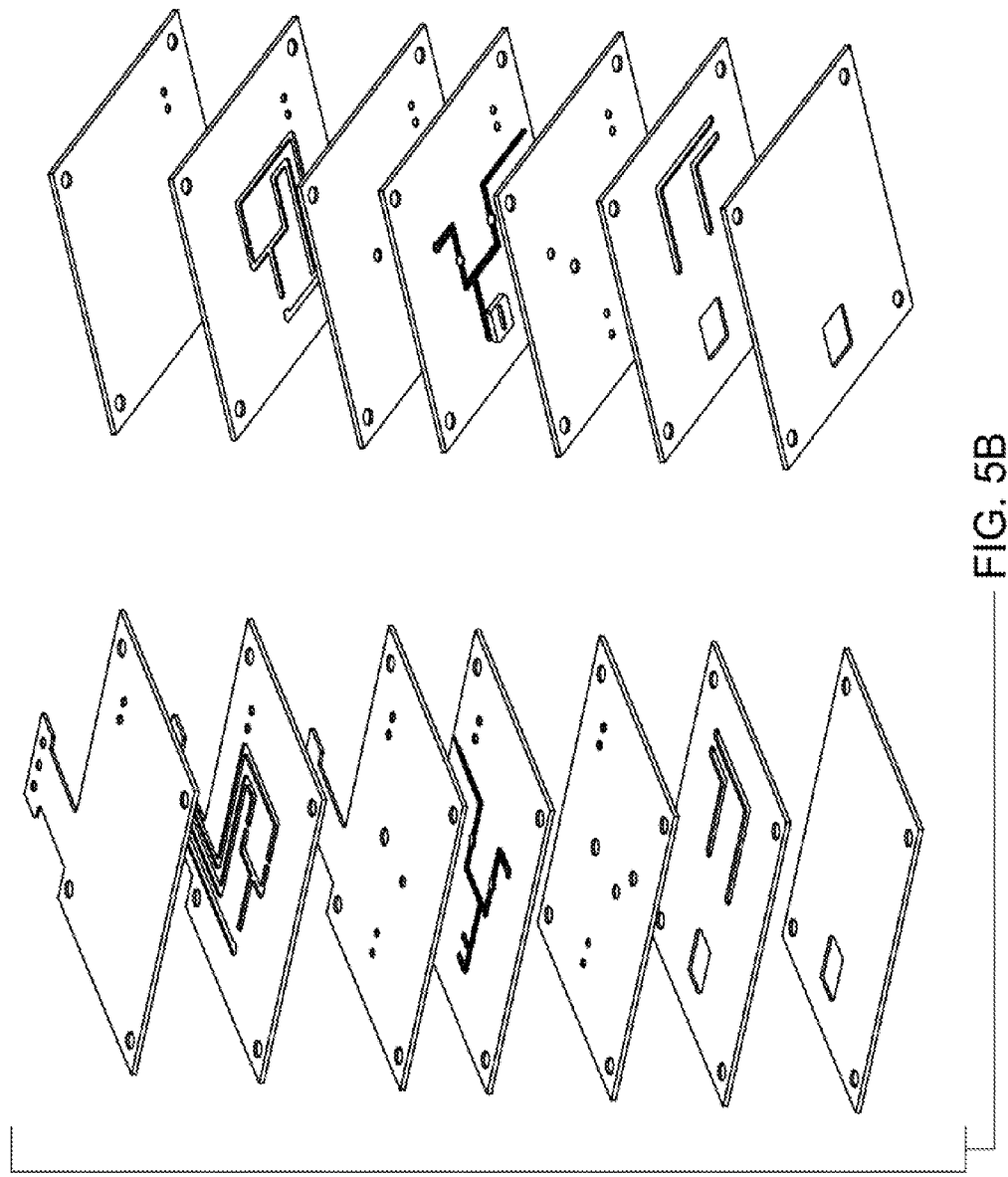
Figure 5C:
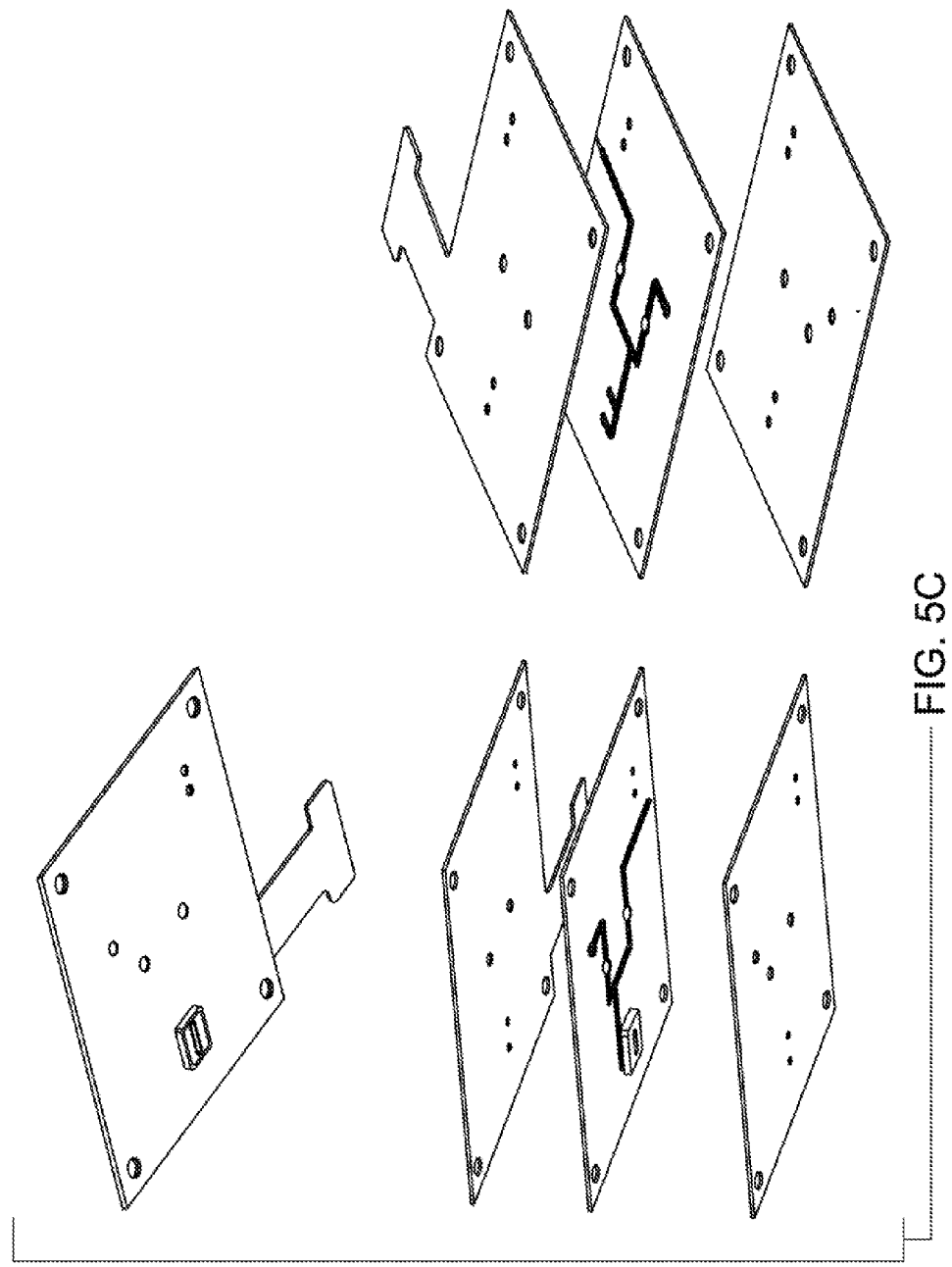
Figure 5D:
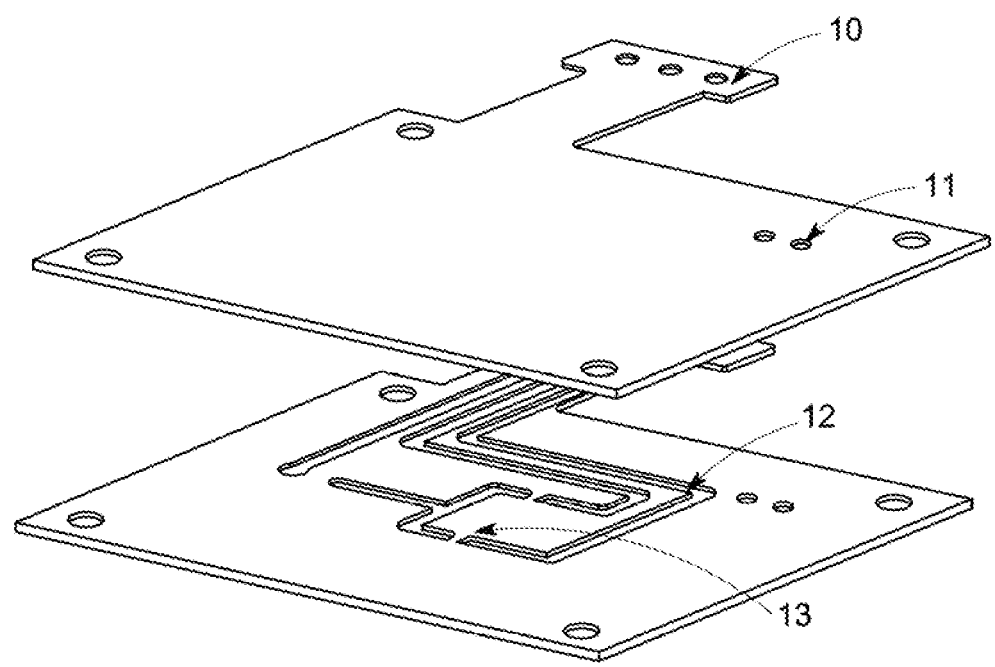

Alternatively, the foil containing channels for compressed air and the bottom foil or moulded plastic part do not need to be first laminated together. Instead, they are laminated with the membrane valve assembly and the flow path assembly to form the laminated microfluidics. Similar to described earlier, the flow path assembly does not need to be laminated a priori. Only the membrane valve assembly needs to be laminated beforehand. All the other foil sheets may be laminated together with the membrane valve assembly at the same time to form the laminated microfluidics. FIG. 4, where the middle three layers, i.e., the membrane valve assembly is made prior to the lamination with the other parts shown, to make the laminated microfluidics.

In another embodiment, it is provided a laminated microfluidics with membrane valves, comprising:

1) a membrane valve assembly comprising (1) three plastic foils laminated together, the first, top foil comprising one through hole for each valve, the second, middle foil has a slit pattern connecting each valve hole of the top foil, and the third, bottom foil has one through hole for each valve and one additional hole entering the slit pattern; (2) a flexible membrane formed in the through hole by liquid rubber injected through the additional hole on the bottom foil layer and the slit pattern; and
2) a flow path comprising a fourth and a fifth plastic foil, wherein the fourth foil contains a slit pattern, with the fourth foil on top of the first foil and the fifth foil on top of the fourth foil;

wherein the membrane valve assembly and the flow path are laminated together.

In certain embodiments, the foils are made of Polyester, Polycarbonate, Polyethylene terephthalate or Polyimide.

In certain embodiments, the flexible membrane valve is made of silicone rubber. In certain embodiments, the fifth foil contain through hole for liquid connections for the flow path. In certain embodiments, the laminated microfluidics further comprises a compressed air assembly including a sixth foil containing channels for compressed air, and a seventh, bottom foil or moulded plastic part with integrated connectors for air and features for positioning the unit in an analytical instrument, with the third foil on top of the sixth foil.

In certain other embodiments, the membrane valve assembly contains through holes for liquid connections for the flow path. In certain embodiments, the laminated microfluidics further comprises a compressed air assembly including a sixth foil containing channels for compressed air, and a seventh, bottom foil or moulded plastic part with integrated connectors for air and features for positioning the unit in an analytical instrument, with the fifth foil on top of the sixth foil.

In certain embodiments, the laminated microfluidics may further comprise a moulded plastic part which comprises channels for compressed air, integrated connectors for air and features for positioning the unit in an analytical instrument.

In certain embodiments, through holes of the laminated microfluidics may comprise soft surfaces such as flow cells and seals for connecting with other liquid handling parts of an analytical system.

FIG. 4 shows an exploded view of each individual foil/sheet that forms a laminated microfluidics with membrane valves according to certain embodiments of the invention.

FIG. 5 shows an alternative design of a laminated microfluidics with membrane valves according to certain other embodiments of the invention. FIG. 5 (a) shows an exploded schematic of the design, as well as a top and bottom view of the laminated microfluidics with membrane valves. This laminated microfluidics includes a membrane valve assembly including foil sheets 3, 4 and 6, as well as foil sheets making up the flow path (foil sheets 1 and 2) and pressurized air path (foil sheets 7 and 8). FIG. 5 (b) shows alternative exploded schematics of the design, from a top and bottom angle, respectively. FIG. 5 (c) shows alternative exploded schematics of foil sheets 3, 4 and 6, as well as a bottom view of the finished membrane valve assembly. FIG. 5 (d) shows exploded schematics of foil sheets 1 and 2, showing details of an exemplary flow path.

The membrane valve assembly is formed by foil sheet 3, 4 and 6. Foil sheet 3 includes holes for valve membranes, soft seals/flow cells, and pressurized air. During manufacturing of the membrane valve assembly, down facing side of foil sheet 3 is optionally treated for rubber adhesion. Foil sheet 4 includes slit patterns for silicone rubber moulding, as well as holes for pressurized air. During manufacturing of the membrane valve assembly, this sheet is optionally double side coated for lamination adhesion and also optionally treated for rubber adhesion. Foil sheet 6 includes holes for valve membranes, soft seals/flow cells, pressurized air, as well as an extra hole for rubber inlet. During manufacturing of the membrane valve assembly, side of this sheet that facing up is optionally treated for rubber adhesion. These three sheets may be laminated together and moulded as explained above, with suitable mould halves such that a flow cell with via holes is moulded at the same time as the valve membrane (labelled as "5" in FIG. 5 (a) and shown as the green elements of FIG. 5(b) and (c)).

The foil sheet 1 is the cover foil, including holes for liquid transport (liquid connections) and holes for pressurized air connections. Foil sheet 2 contains liquid channels and holes for pressurized air. During manufacturing of the membrane valve assembly, this foil is optionally double side coated for lamination adhesion. These foils, when laminated together with the membrane valve assembly, form microfluidic channels for liquid handling.

The foil sheet 7 and 8 form the channels for compressed air. Foil sheet 7 includes channels for pressurized air cut outs and hole for flow cell moulding. During manufacturing of the membrane valve assembly, this sheet may be double side coated for lamination adhesion. Foil sheet 8 is the cover foil with hole for flow cell moulding.

The holes for pressurized air may alternatively located on foil sheet 8, instead of on foil sheets 1-6.

The flow cell with via holes may connect the microfluidic channels with other functionalities of a bioanalytical system, such as a sensorchip, to deliver liquid to the sensorchip.

In FIG. 5, the liquid connections are shown to be on an elongated part of the top foil sheet 1, away from the center of the laminated microfluidics. In certain embodiments, such placement of the liquid connections enables direct connection between these liquid connections and other parts of a bioanalytical system, and reduced/eliminates the use of tubing. Depending on the application, the foil sheet used may be more flexible, or stiffer, and the liquid connections may be closer or further away from the center of the laminated microfluidics. In certain embodiments, the foil sheets may be bendable, thus the microfluidics is bendable. This enables docking of the liquid connections with other parts of a bioanalytical system through movable flexible microfluidics instead of movable optics, enabling one step optics assembly. Bending the microfluidics also enables making any part of it into a three dimensional structure, potentially with internal support in the middle of the three dimensional structure. Connection with other liquid parts of a bioanalytical system may be accomplished, optionally, for example, on a side of the three dimensional structure.

The laminated microfluidics with membrane valves made according to the above method offers a number of advantages:

- Expensive injection moulding tools are not needed. (The bottom plate with connectors for air can be the same for multiple types of microfluidics)
- Eliminating the manual gluing process provides a more cost effective process.
- Heat transfer between surrounding air and liquids is improved.
- The microfluidics can be bendable. (Docking by moving fluidics instead of optics, enables better heat transfer and one step optics assembly)
- Silicone rubber surface area is reduced.
- Shorter via holes means shorter cores in silicone moulds. Moulds are easier to make.
- Internal dead volume is reduced due to shorter via-holes.
- Providing possibilities for crossing liquid and control channels is easier.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A method for making a laminated microfluidics device including membrane valves, said method comprising:
    a) generating a membrane valve assembly comprising (1) laminating three plastic foils together, the first, top foil comprising one through hole for each valve, the second, middle foil having a slit pattern connecting each valve hole of the top foil, and the third, bottom foil having one through hole for each valve and one additional hole at the slit pattern, thereby producing a laminated foil; (2) placing the laminated foil on a mould having a mould surface with the bottom foil facing said surface, the surface including one or more protruding cylinders that concentrically fit within the through holes of the laminated foil yet leave room for a valve membrane to form, and closing the mould; (3) forming said valve membrane by injecting and allowing to cure a liquid comprising rubber or a thermoplastic elastomer into a cavity formed between the cylinders and the through holes of the top and bottom layers, the liquid being injected into the cavity via the additional hole and the slit pattern; and
    b) laminating said membrane valve assembly and a flow path, the flow path comprising a fourth and a fifth plastic foil, wherein the fourth foil contains a further slit pattern, with the fourth foil on top of the first foil and the fifth foil on top of the fourth foil.

2. The method of claim 1, wherein the fifth foil contain a through hole for liquid connections for the flow path.

3. The method of claim 1, wherein the membrane valve assembly contains further through holes for liquid connections for the flow path.

4. The method of claim 2, further comprising:
    c) further laminating a compressed air assembly including a sixth foil containing channels for compressed air, and a seventh, bottom foil or moulded plastic part with integrated connectors for compressed air and features for positioning the unit in an analytical instrument, with the third foil on top of the sixth foil.

5. The method of claim 4, wherein the compressed air assembly is first laminated together before step c).

6. The method of claim 4, wherein the sixth foil and the seventh, bottom foil or moulded plastic part are laminated with the membrane valve assembly and the flow path at the same time.

7. The method of claim 1, further comprising: c) laminating a moulded plastic part which comprises channels for compressed air, integrated connectors for air and features for positioning the unit in an analytical instrument.

8. The method of claim 1, wherein the two or more plastic foils that form the flow path are first laminated to form a flow path assembly prior to step (b).

9. The method of claim 1, wherein the two or more plastic foils that form the flow path are laminated together at the same time with the membrane valve assembly.

10. The method of claim 1, wherein the through hole comprises soft surfaces such as flow cells and seals for connecting.

11. The method of claim 1, wherein before step (a)(2), the laminated membrane valve assembly is treated for silicone rubber adhesion.

12. The method of claim 1, wherein before step (a)(2), the top foil is covered with a breathable low tack-liner which is removed prior to laminating step (b).

13. The method of claim 1, wherein the third, bottom foil on the side away from the second, middle foil is covered by a liner before step a)(2).

14. The method of claim 1, wherein the foils are coated with adhesive to facilitate lamination.

15. The method of claim 3, further comprising:
    c) further laminating a compressed air assembly including a sixth foil containing channels for compressed air, and a seventh, bottom foil or moulded plastic pan with integrated connectors for air and features for positioning the unit in an analytical instrument, with the fifth foil on top of the sixth foil.

16. The method of claim 15, wherein the compressed air assembly is first laminated together before step c).

17. The method of claim 15, wherein the sixth foil and the seventh, bottom foil or moulded plastic pan are laminated with the membrane valve assembly and the flow path at the same time.

18. A laminated microfluidics device having membrane valves, comprising:
  a membrane valve assembly comprising (1) three plastic foils laminated together, a first, top foil comprising one through hole for each valve, a second, middle foil having a slit pattern connecting each valve hole of the top foil, and a third, bottom foil having one through hole for each valve and one additional hole at the slit pattern; (2) a flexible membrane formed in the through holes of the first and third foils by liquid injected through the additional hole on the bottom foil layer and through the slit pattern; and
  a flow path comprising a fourth and a fifth plastic foil, wherein the fourth foil contains a further slit pattern, with the fourth foil on top of the first foil and the fifth foil on top of the fourth foil;
wherein the membrane valve assembly and the flow path are laminated together.

19. The laminated microfluidics device of claim 18, wherein the fifth foil contain through hole for liquid connections for the flow path.

20. The laminated microfluidics device of claim 18, wherein the membrane valve assembly contains through holes for liquid connections for the flow path.

21. The laminated microfluidics device of claim 19, further comprising:
  a compressed air assembly including a sixth foil containing channels for compressed air, and a seventh, bottom foil or moulded plastic part with integrated connectors for air and features for positioning the unit in an analytical instrument, with the third foil on top of the sixth foil.

22. The laminated microcluidics device of claim 18, further comprising: a moulded plastic part which comprises channels for compressed air, integrated connectors for air and features for positioning the unit in an analytical instrument.

23. The laminated microfluidics device of claim 19, wherein the through hole comprises soft surfaces such as flow cells and seals for connecting with other liquid handling parts of an analytical system.

24. The laminated microfluidics device of claim 18, wherein the foils are made of Polyester, Polycarbonate, Polyethylene terephthalate or Polyimide.

25. The. laminated microfluidics device of claim 20, further comprising a compressed air assembly including a. sixth foil containing channels for compressed air, and a seventh, bottom foil or moulded plastic part with integrated connectors for air and features for positioning the unit in an analytical instrument, with the fifth foil on top of the sixth foil.

26. The laminated microfluidics device of claim 18, wherein the flexible membrane is made of silicone rubber.

* * * * *